(12) United States Patent
    Cousineau et al.

(10) Patent No.: US 12,617,667 B2
(45) Date of Patent: May 5, 2026

(54) VAPOR LINE COUPLER

(71) Applicants: Jeffrey Scott Cousineau, Centerville, OH (US); Joseph Patrick Roth, Milford, OH (US); Tod David Usrey, Liberty Township, OH (US)

(72) Inventors: Jeffrey Scott Cousineau, Centerville, OH (US); Joseph Patrick Roth, Milford, OH (US); Tod David Usrey, Liberty Township, OH (US)

(73) Assignee: Knappco LLC, Hamilton, OH (US)

( * ) Notice: Subject to any disclaimer, the term of this patent is extended or adjusted under 35 U.S.C. 154(b) by 80 days.

(21) Appl. No.: 18/945,114

(22) Filed: Nov. 12, 2024

(65) Prior Publication Data

US 2025/0153996 A1      May 15, 2025

Related U.S. Application Data

(60) Provisional application No. 63/548,247, filed on Nov. 13, 2023.

(51) Int. Cl.
    B67D 7/04        (2010.01)
    B67D 7/54        (2010.01)
            (Continued)

(52) U.S. Cl.
    CPC .............. B67D 7/048 (2013.01); B67D 7/54 (2013.01); F16L 37/18 (2013.01); F16L 37/32 (2013.01)

(58) Field of Classification Search
    CPC . B67D 7/048; B67D 7/54; F16L 37/18; F16L 37/32
    See application file for complete search history.

(56) References Cited

U.S. PATENT DOCUMENTS 404,786 A * 6/1889 Hanson ................... F16L 37/32
                                        137/614.04
863,903 A * 8/1907 Chapple ................. F16L 37/18
                                        285/87

(Continued)

OTHER PUBLICATIONS

Civacon, 611T-AL40-NPT Vapor Recovery Adaptor. www.civacon.com. 11 pages. Revised Nov. 2011. Kansas City, MO, USA.

(Continued)

*Primary Examiner* — Umashankar Venkatesan
(74) *Attorney, Agent, or Firm* — Thompson Hine LLP

(57)         ABSTRACT

A system including an coupler configured to be coupled to an adapter, the coupler including a body defining a fluid path through which vapor is configured to flow, and a valve positioned in the fluid path. The valve is biased to a closed position and configured to be moved to an open position when the coupler is coupled to an adapter. The coupler further includes an arm coupled to the body, wherein the arm includes a first arm portion located on a first side of the body and a second arm portion located on a second, opposite side of the body. The arm is configured to be moved to an energized position wherein the first and second arm portions are both biased radially inwardly. The arm is thereby configured such that when the coupler receives the adapter, having a groove, in the coupler at a sufficient depth the first and second arm portions each move radially inwardly into the groove to thereby couple the coupler and the adapter.

26 Claims, 17 Drawing Sheets

(51) Int. Cl.
      *F16L 37/18*         (2006.01)
      *F16L 37/32*         (2006.01)

(56)                References Cited

U.S. PATENT DOCUMENTS

| | | | | |
|---|---|---|---|---|
| 2,770,256 | A * | 11/1956 | Krapp | F16L 37/18 |
| | | | | 285/320 |
| 4,030,524 | A | 6/1977 | McMath et al. | |
| 4,056,133 | A * | 11/1977 | Deters | B67D 7/048 |
| | | | | 137/486 |
| 4,234,161 | A | 11/1980 | Wilder et al. | |
| 5,816,623 | A * | 10/1998 | Chang | F16L 37/18 |
| | | | | 285/309 |
| 9,346,663 | B1 * | 5/2016 | Schultz, Jr. | B67D 7/3209 |
| 9,995,420 | B1 * | 6/2018 | Topacio | F16K 17/04 |
| 10,655,769 | B1 * | 5/2020 | Hartman | F16L 37/18 |
| 10,767,799 | B2 * | 9/2020 | Hudson | F16L 37/18 |
| 2011/0108159 | A1 | 5/2011 | Grote | |
| 2011/0260444 | A1 * | 10/2011 | Lee | F16L 37/18 |
| | | | | 285/85 |
| 2015/0252931 | A1 * | 9/2015 | Solimar | F16L 37/18 |
| | | | | 285/312 |
| 2017/0334640 | A1 * | 11/2017 | Roth | B65D 90/66 |

OTHER PUBLICATIONS

Civacon, 80TT Series Vapor Recovery Elbow. www.civaconcom. 2 pages. Revised Mar. 2016. Kansas City, MO, USA.

* cited by examiner

VAPOR LINE COUPLER

This application claims priority to U.S. provisional patent application Ser. No. 63/548,247 filed on Nov. 13, 2023, the entire contents of which are hereby incorporated by reference.

The present invention is directed to a coupler for use with a vapor line, and more particularly, to coupler that can fluidly connect together portions of a vapor line.

BACKGROUND

Fluid tanks and the like are used to store relatively large amounts of fluid, such as fuels. When the fuel is transferred out of or into the tank, the incoming fuel expels a corresponding volume of vapors, which are usually desired to be captured during the fluid transfer process. Vapor lines, such as hoses and/or conduits, are typically connected to the tanks to capture the expelled vapors. Vapor couplers are, in turn, typically used to couple the vapor lines to the tank or to other components.

Many existing vapor couplers utilize a pair of opposed handles that must be independently operated to in order to provide a secure vapor line coupling. In addition, many existing couplers require the coupler to be held in place while one or both handles are secured. However when used in the field the users/operators do not always secure both handles, which can lead to improper couplings and/or potential escape of vapor during refueling operations.

SUMMARY

In one embodiment the present invention is vapor coupler which is simple and intuitive to use, and provides a strong and reliable connection. More particularly, in one embodiment the invention is a system including an coupler configured to be coupled to an adapter, the coupler including a body defining a fluid path through which vapor is configured to flow, and a valve positioned in the fluid path. The valve is biased to a closed position and configured to be moved to an open position when the coupler is coupled to an adapter. The coupler further includes an arm positioned coupled to the body, wherein the arm includes a first arm portion located on a first side of the body and a second arm portion located on a second, opposite side of the body. The arm is configured to be moved to an energized position wherein the first and second arm portions are both biased radially inwardly. The arm is thereby configured such that when the coupler receives the adapter, having a groove, in the coupler at a sufficient depth the first and second arm portions each move radially inwardly into the groove to thereby couple the coupler and the adapter.

DETAILED DESCRIPTION

Figure 1:
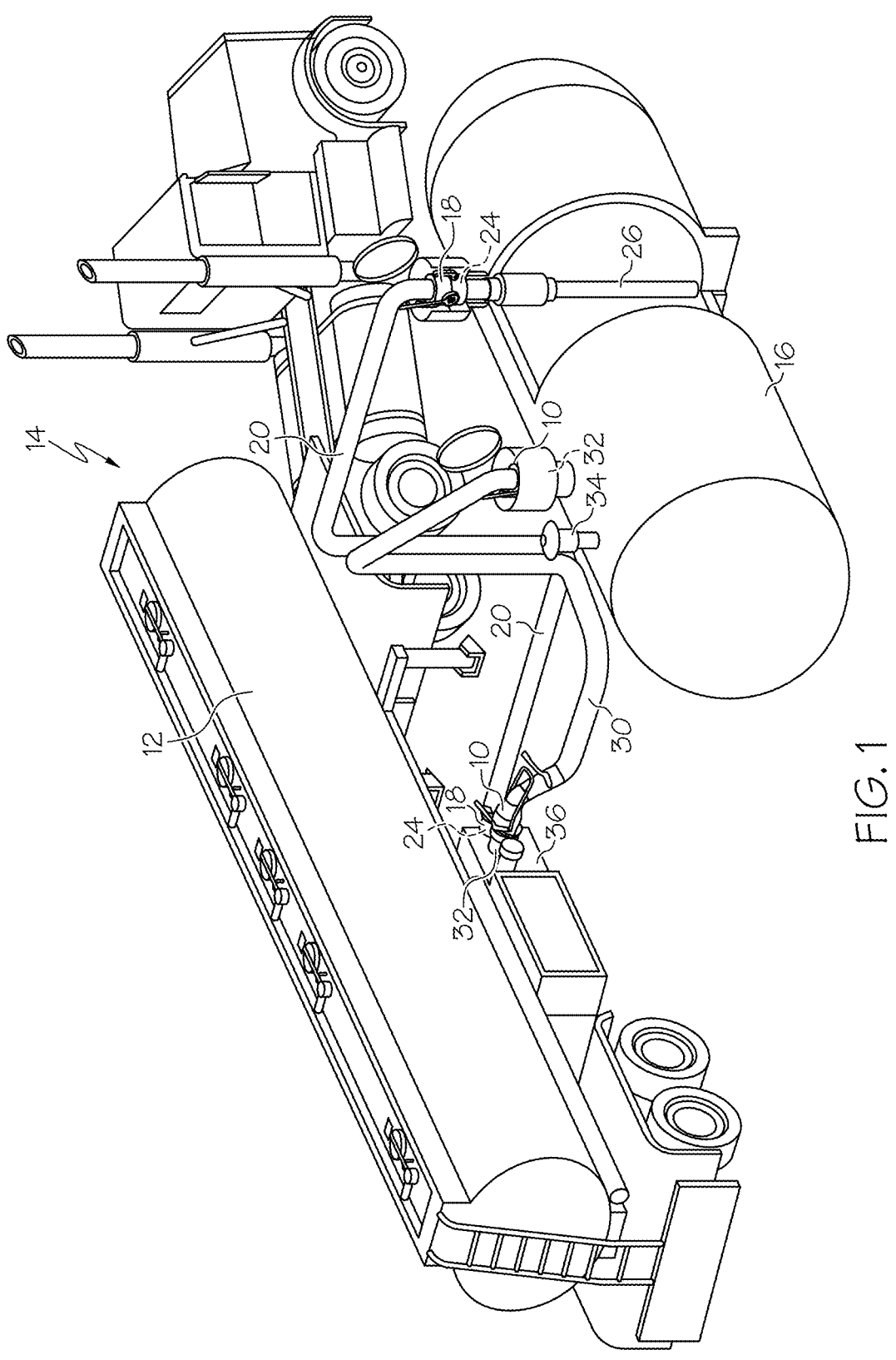
FIG. 1 is a front perspective view of a refilling tank truck in conjunction with a storage tank.

The vapor coupler 10 described and shown herein can be used in the conveyance of vapor to and from various tanks. With reference to FIG. 1, the coupler 10 can in one case be used in conjunction with a storage tank 12 that is coupled to, or part of, an adjacent truck/tractor 14 that can transport the storage tank 12 to any of a variety of desired locations. In FIG. 1 the tractor 14 and storage tank 12 are shown positioned adjacent to a dispenser storage vessel 16. The storage tank 12 and dispenser storage vessel 16 can each be utilized to transport/store any of a wide variety of fluids, such as liquids and/or gases (termed a subject fluid herein) including but not limited to fuels, and more particularly petroleum-based fuels such as gasoline, diesel, natural gas, biofuels, oil or the like, or ethanol the like, or combinations thereof.

In order to transfer the subject fluid from the storage tank 12 to the dispenser storage vessel 16, a subject fluid line 20 (such as a hose and/or conduit) is coupled to the storage tank 12 at one end, and coupled to the dispenser storage vessel 16 at the other end to provide fluid communication therebetween. In particular, the subject fluid line 20 can include a coupler 18, and the storage tank 12 can include an adapter 24 that is configured to be mechanically and fluidly coupled to the coupler 18 so that the subject fluid can flow into or out of the subject fluid line 20. Similarly, the distal end of the subject fluid line 20 can include another coupler 18, and the dispenser storage vessel 16 can include an adapter 24 that is configured to be mechanically and fluidly coupled to the coupler 18 so that the subject fluid can flow therethrough.

In order to transfer vapors from the dispenser storage vessel 16 to the storage tank 12, a vapor line 30 (such as a hose and/or conduit) is coupled to the storage tank 12 and the dispenser storage vessel 16 to provides fluid communication therebetween. In particular, the vapor line 30 can include a coupler 10, and the storage tank 12 can include an adapter 32 that is configured to be mechanically and fluidly coupled to the coupler 10 so that vapor can flow therethrough. Similarly, the distal end of the vapor line 30 can include another coupler 10, and the dispenser storage vessel 16 can include an adapter 32 that is configured to be mechanically and fluidly coupled to the coupler 10 so that vapor can flow therethrough.

In one mode of operation, the subject fluid is pumped from the storage tank 12, through the fluid line 20, and into a fill pipe 26 of the dispenser storage vessel 16. At the same time the vapor line 30 returns vapors, that are displaced by the introduction of the subject fluid into the dispenser storage vessel 16 during refilling, from the dispenser storage vessel 16 to a vapor storage space of the storage tank 12. The dispenser storage tank 16 may also include a vent 34 for exhausting gas or vapor to alleviate excess pressure in the dispenser storage tank 16.

The subject fluid adapter 24 and the vapor adapter 32 are positioned below the storage tank 12 in the illustrated embodiment. However it should be noted that the subject fluid adapter 24 and the vapor adapter 32 can be located at different locations than that shown in FIG. 1, and/or additional subject fluid adapters 24 and vapor adapters 32 can be located at other positions on the storage tank 12. In addition, in the embodiment of FIG. 1, the tank truck 14 has an integrated pump 36 that is configured to direct subject fluid through the subject fluid line 20 and into the dispenser storage vessel 16. In this configuration the storage tank 12 is directly coupled to the dispenser storage vessel 16 in a so-called "direct fill" configuration wherein fluid exiting the storage tank 12 flows into the dispenser storage vessel 16 without passing through a pump external of the tank truck 14/storage tank 12. In an alternate embodiment (not shown), an external pump can be used to pump subject fluid from the storage tank 12 to the dispenser storage vessel 16.

In yet another case, when the storage tank 12 needs to be refilled, the tank trunk 14 is driven to a refueling terminal, and another fuel line (not shown) is coupled to the subject fluid adapter 24 (or to a different adapter) and another vapor line (not shown) is coupled to the adapter 32 (or to a different vapor adapter). Subject fluid is then fed into the storage tank 12 via the subject fluid line 20, and vapors are expelled through the vapor line 30. Thus in this configuration the flow of fluid through the subject fluid line 20 and the vapor line 30 is reversed from that described above and shown in FIG. 1, and the vapor coupler 10 shown and described herein can be used in either scenario.

Figure 2:
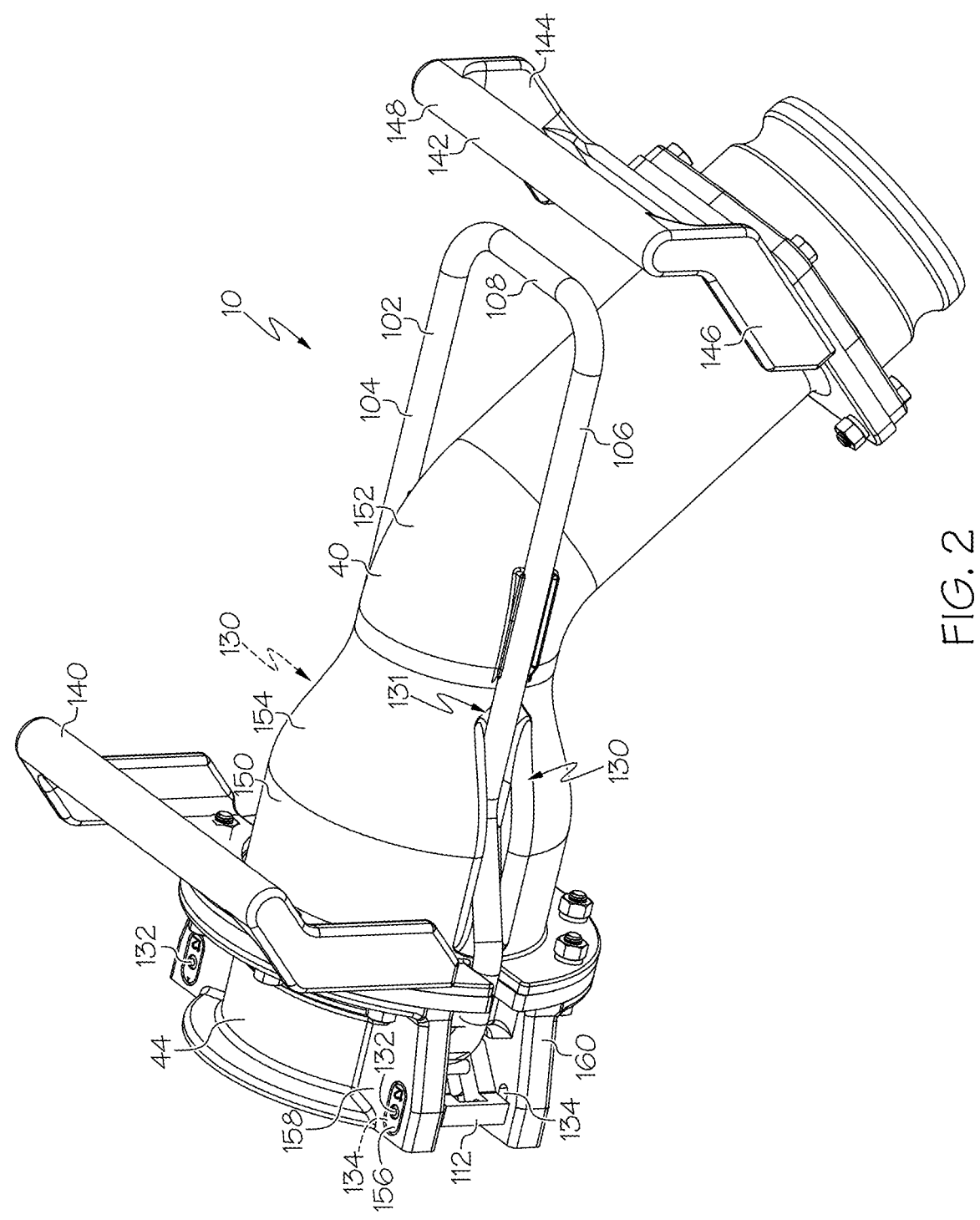
FIG. 2 is a rear perspective view of the vapor coupler of FIG. 1.
Figure 3:
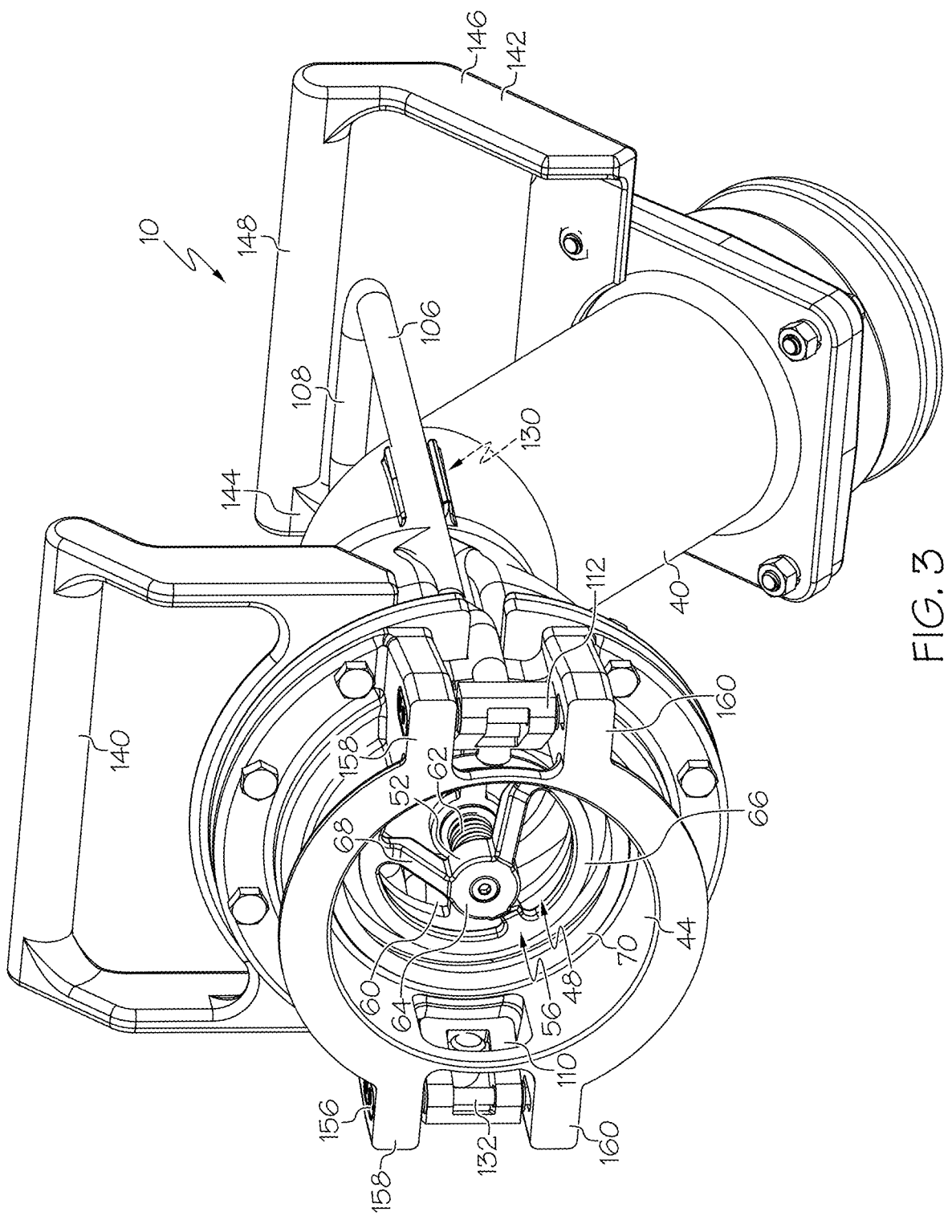
FIG. 3 is a front perspective view of the coupler of FIG. 2.
Figure 5:
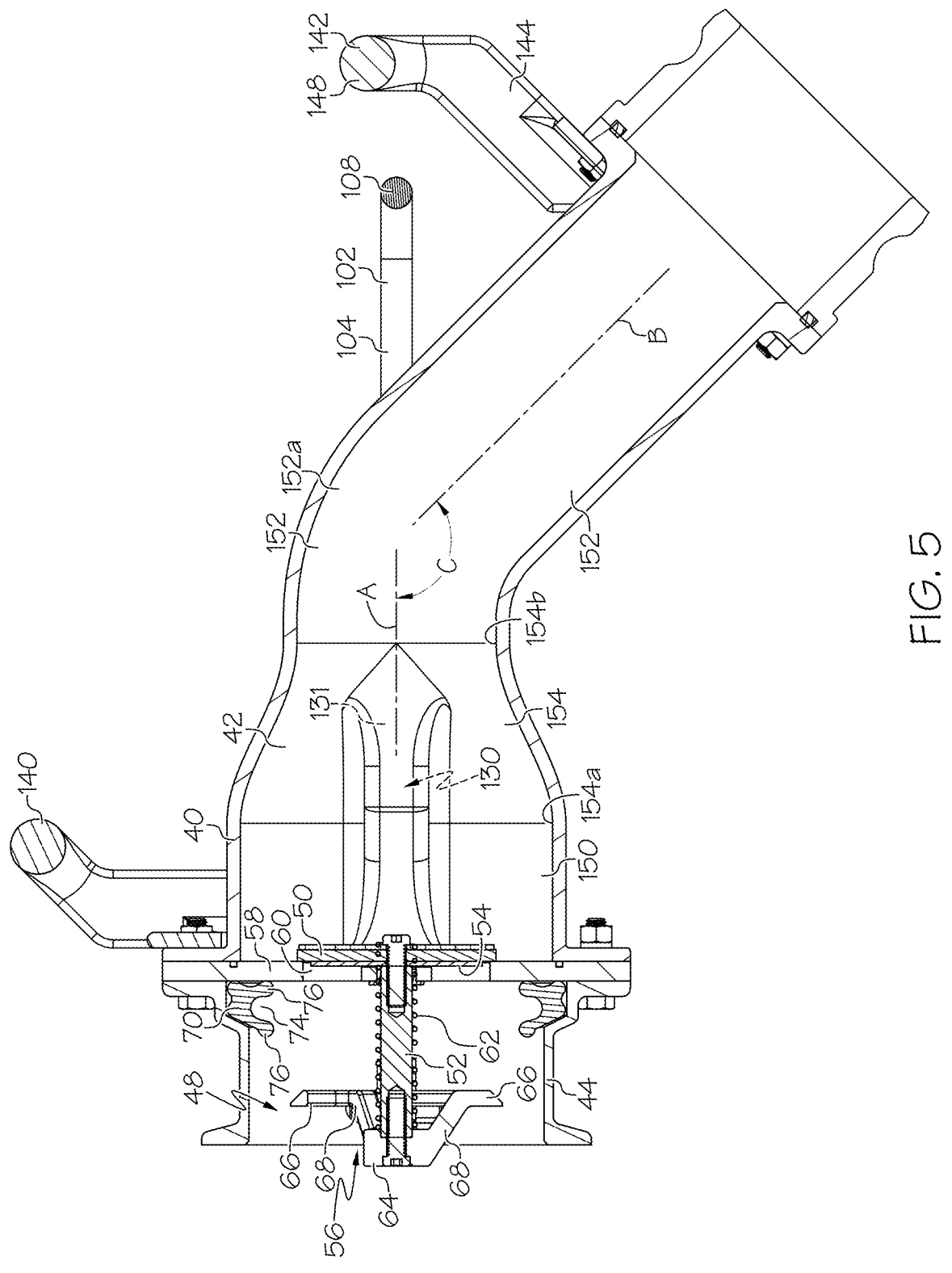
FIG. 5 is a side cross section of the coupler of FIG. 2.

FIGS. 2, 3, and 5 further illustrate the coupler 10 of FIG. 1. In particular, the coupler 10 can have a body 40 that defines a fluid path 42 therein through which vapor is designed to flow. The body 40 of the coupler or female component 10 has generally annular connection portion 44 at a forward/proximal end thereof, configured to closely receive a generally annular connection portion 46 (FIG. 6) of the adapter or male component 32 therein. The coupler 10 can further include a poppet valve 48 positioned in the body 40 at or adjacent to its outer/distal end. The poppet valve 48 can include a generally flat, planar sealing plate 50 and a radially-centered, axially extending extension portion 52 extending axially forwardly from the sealing plate 50 (for case of reference, it is noted that "forwardly" as used herein means toward the adjacent open end in the axial direction, and "rearwardly" means the opposite direction since, as noted above, vapor can flow through the coupler 10 (and adapter 32) in either direction). The sealing plate 50 has a seal 54 located on a forward surface thereof. An actuator 56 is coupled to a forward end of the extension portion 52.

The coupler 10/poppet valve 48 can further have a valve seat/poppet plate 58 fixedly coupled to the body 40 of the coupler 10 and having an opening 60 formed therethrough. The poppet valve 48 has a poppet spring 62 positioned about the extension portion 52, and the poppet spring 62 is captured axially, in some cases in a state of compression, between the actuator 56 and the poppet plate 58. The poppet spring 62 thereby biases the poppet valve 48/scaling plate 50 to a closed position (FIGS. 5-7) wherein the seal 54/sealing plate 50 is pressed against the poppet plate 58 to prevent fluid from flowing through the coupler 10. The poppet valve 48 is also movable to an open position (FIGS. 8-12) wherein the seal 54/sealing plate 50 is spaced away the poppet plate 58, and the poppet spring 62 is compressed (or further compressed), to enable fluid to flow through the opening 60/coupler 10. The valve 48 is thus biased to a closed position and configured to be moved to an open position when the coupler 10 is coupled to the adapter 32, as will be described in greater detail below.

In one case, the poppet plate 58 is removably positioned in the coupler 10, rather than being permanently coupled to the coupler 10 such as being cast in place. The removable nature of the poppet plate 58 enables the poppet plate 58 and/or the poppet valve 48 as a whole to be replaced if they become damaged or worn.

The actuator 56 of the poppet valve 48 has a radially centered head 64 at a distal/forward end thereof, and a circumferentially-extending, radially outwardly-positioned actuating flange 66. The actuating flange 66 is offset/recessed rearwardly, in the axial direction, from the head 64, and is positioned radially outside of the head 64, for purposes which are described in greater detail below. The actuator 56 further includes a plurality of circumferentially spaced connecting bodies 68 extending between the head 64 and the actuating flange 66. Each connecting body 68 (or at least part thereof) is oriented at an angle relative to a central axis of the coupler 10 and/or relative to the flow of fluid through the coupler 10.

The coupler 10 can include a seal 70 positioned in the fluid path 42, in contact with and positioned immediately forwardly of the poppet plate 58 in one case. The seal 70 is shown positioned in or adjacent to the connection portion 44, and positioned radially inside a seal retainer 72 that closely receives the seal 70 therein. The seal 70 is generally annular in one case extending 360 degrees, and has a circumferentially-extending groove 74 on its radially inner surface. The seal 70 is thus generally "U" shaped in cross section, and the groove 74 defines a pair of circumferentially extending lips 76 on opposite axial sides thereof. The seal 70 can be made of any of a variety of pliable, elastically deformable materials, such as rubber, synthetic rubber (including nitrile rubber), elastomers or the like.

With reference to FIGS. 6-12, the adapter 32 can include a body 78 that defines a fluid path 80 therein through which vapor is designed to flow. The body 78 of the adapter 32 has the generally annular connection portion 46 at its forward end, having a recess or groove 84 located on a radially outer surface thereof and extending about a perimeter/circumference thereof. The connection 46 portion can also have an angled/chamfered engagement surface 86 at its forward edge thereof. The adapter 32 can further include a poppet valve 88 positioned in the body 78 at or adjacent to its forward end. The poppet valve 88 can include a generally flat, planar scaling plate 90 and radially-centered, axially extending stem 92 extending rearwardly from the sealing plate 90. The poppet valve 88 includes a radially-centered extension portion 94 extending axially forwardly from the sealing plate 90.

The sealing plate 90 has a seal 96 extending circumferentially about the sealing plate 90 about an outer edge thereof. The sealing plate 90 is biased, by an associated poppet spring 98, to a closed position (FIGS. 6 and 7) wherein the seal 96 sealingly engages a valve seat 100 of the body 78 of the adapter 32 to prevent fluid from flowing through the adapter 32. The poppet valve 88 is movable to an open position, wherein the sealing plate 90 is moved axially rearwardly away from the valve seat 100, compressing (or further compressing) the associated poppet spring 98, to allow fluid to flow through the adapter 32. The coupler 10 and/or adapter 32 can be made of any of a wide variety of materials, such as metals (including aluminum), metal alloys, polymers, fiberglass, composite materials and combinations thereof.

Figure 4:
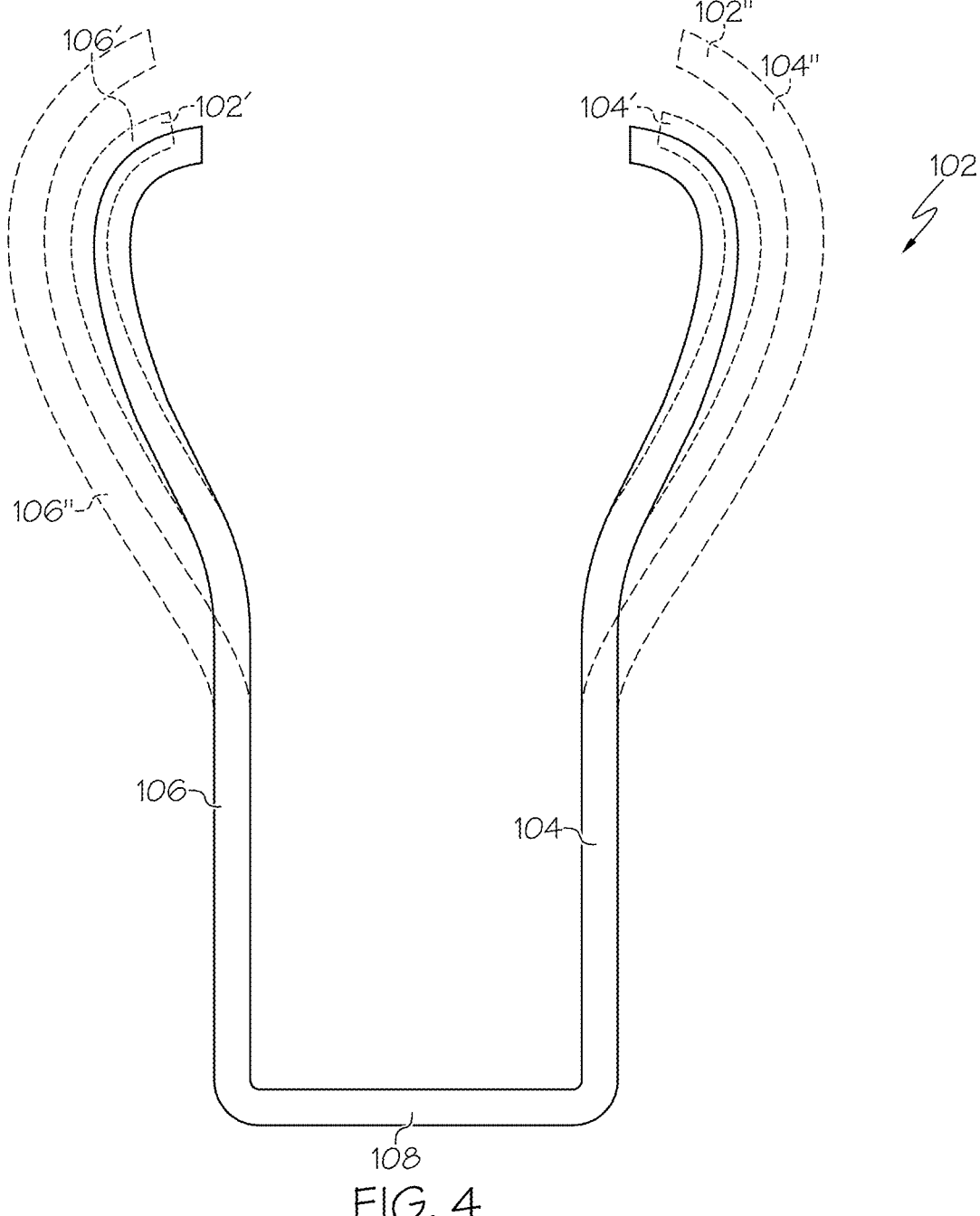
FIG. 4 is a top view of the arm of the coupler of FIG. 2, shown in a rest position, and a first and a second retracted/biased position in broken lines.

With reference to FIGS. 2-4, the coupler 10 has an arm 102 positioned on an outer surface of the body 40. The arm 102 includes a first arm portion 104 and a second arm portion 106, wherein the first 104 and second 106 arm portions are generally parallel to each other, and to the central axis A of the coupler 10 at its forward end. The arm 102 further includes a gripping portion 108 oriented generally perpendicular to the first 104 and second arm portions 106. The gripping portion 108 is coupled to the first arm portion 104 at one end thereof and to the second arm portion 106 at the other end thereof, and the arm 102 is generally "U" shaped in top view as shown in FIG. 4. The arm 102, including the gripping portion 108, the first arm portion 104 and the second arm portion 106 can in one case be a single continuous unitary component, and can be made of any of a wide variety of materials, such as metals (including aluminum), metal alloys, polymers, fiberglass, composite materials and combinations thereof.

The arm 102/first arm portion 104 can include a first cam 110 coupled to a distal end of a main body of the first arm portion 104. The arm 102/second arm portion 106 can similarly include a second cam 112 coupled to a distal end of a main body of the second arm portion 106. Each cam 110, 112 can be a relatively short, rigid component that is pivotally mounted. In particular, with reference to FIGS. 6-13, the first cam 110 is pivotally coupled, at one end/pivot location 114 to the distal end of the body of the first arm portion 104, and is pivotally coupled, at the other end/pivot location 116, to the body 40 of the coupler 10. Similarly, the second cam 112 is pivotally coupled, at one end/pivot location 118 to the distal end of the body of the second arm portion 106, and is pivotally coupled, at the other end/pivot location 120, to the body 40 of the coupler 10.

The arm 102 is mounted to the coupler 10 on an outer surface of the body 40, and positioned externally of the fluid path 42. When the arm 102 is mounted in place the gripping portion 108 is oriented generally transverse to the central axis A of the coupler 10 and generally transverse to a direction of a flow of fluid through the fluid path 42. In addition when the arm 102 is mounted in place the first 104 and second 106 arm portions extend axially and are oriented generally parallel to the fluid path 42. The arm 102 is movable in the axial direction between a forward position, shown in FIGS. 6 and 7, and a retracted position shown in FIG. 11.

When the arm 102 is mounted in place, the first 104 and second 106 arm portions can be sprung/energized in the radially outer direction due to their interaction with the outer surface of the body 40. In particular FIG. 4 shows the first 104 and second 106 arm portions in solid lines in their rest/unbiased/undeformed position in the absence of outside forces (e.g. when not mounted on the body 40). FIG. 4 further shows, in hidden lines, the first 104' and second 106' arm portions when the arm 102 is mounted on the body 40 (it should be noted that the arm portions 104', 106', and in particular the amount of displacement from the rest position, is not necessarily to scale in FIG. 4, and the illustrated deflection may be greater than that actually experienced, for illustrative purposes).

As shown in FIG. 4, when the arm 102 is mounted onto the body 40 and in the forward position (also shown in FIGS. 6 and 7), the arm 102 is slightly sprung/energized to the its first energized position (position 102' in FIG. 4). In contrast, when the arm 102 is moved axially rearward to its retracted position (FIG. 11), and/or when the arm portions 104, 106 are moved radially outwardly (FIG. 9), the arm 102 is in its second (greater) energized position, shown in broken lines as arm 102" in FIG. 4. In particular, when the arm 102 is mounted onto the body 40 of the coupler 10 and in the second or supplemental energized position, the first 104 and second 106 arm portions are resiliently deflected radially outwardly, and thus the arm portions 104, 106 are biased to move radially inwardly to the first energized position 102' (and/or to the neutral position 102) due to the inherent shape of the arm 102. The arm 102 is thus able to be spring energized (when mounted) and further spring energized (when moved) and provide potential energy, and when the arm 102 is energized the arm portions 104, 106 are thus biased to move radially inwardly in the manner of a pair of pincers.

Figure 6:
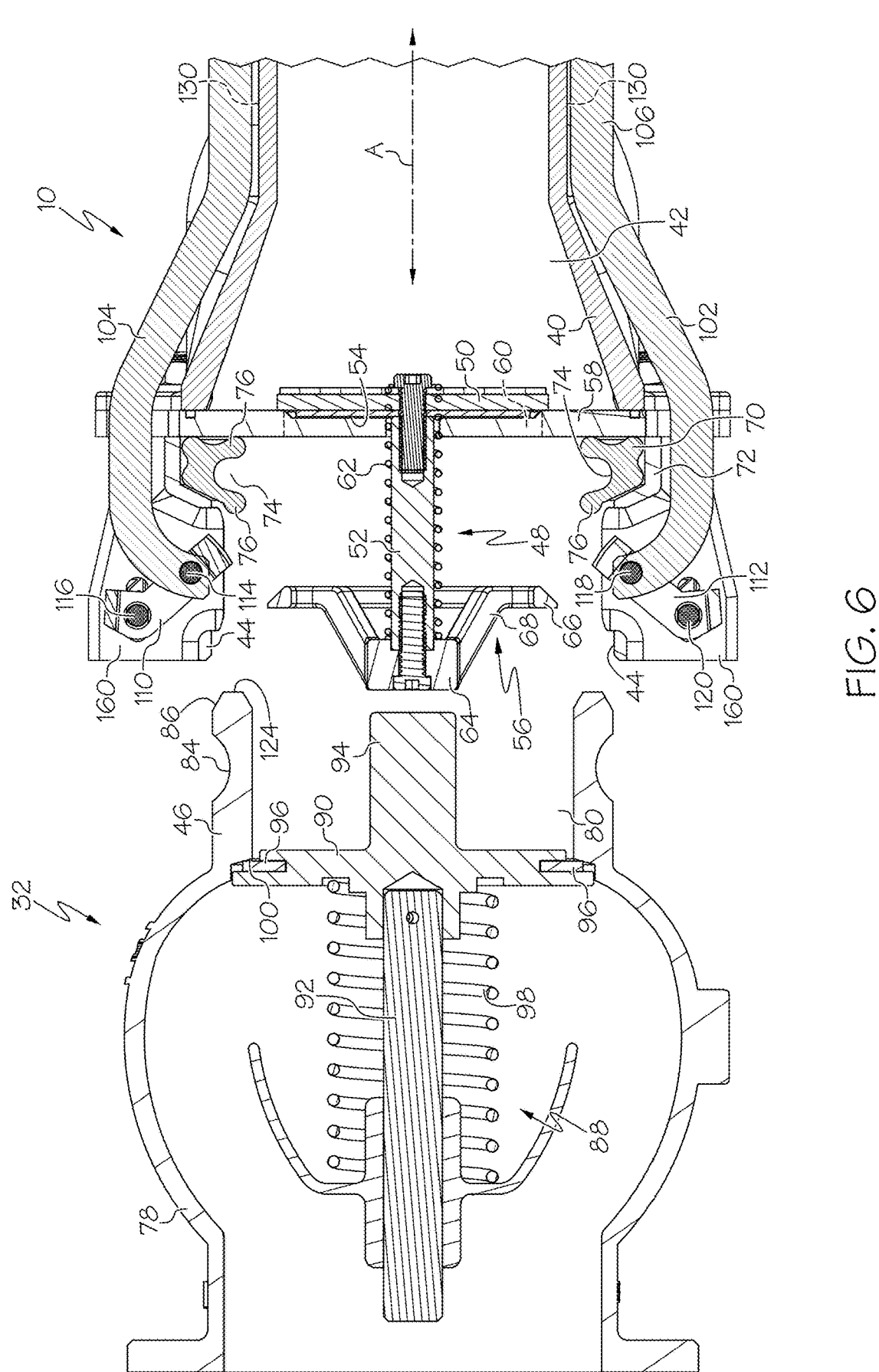
FIG. 6 is a detailed side cross section of the coupler of FIG. 2, shown in conjunction with an adapter.
Figure 7:
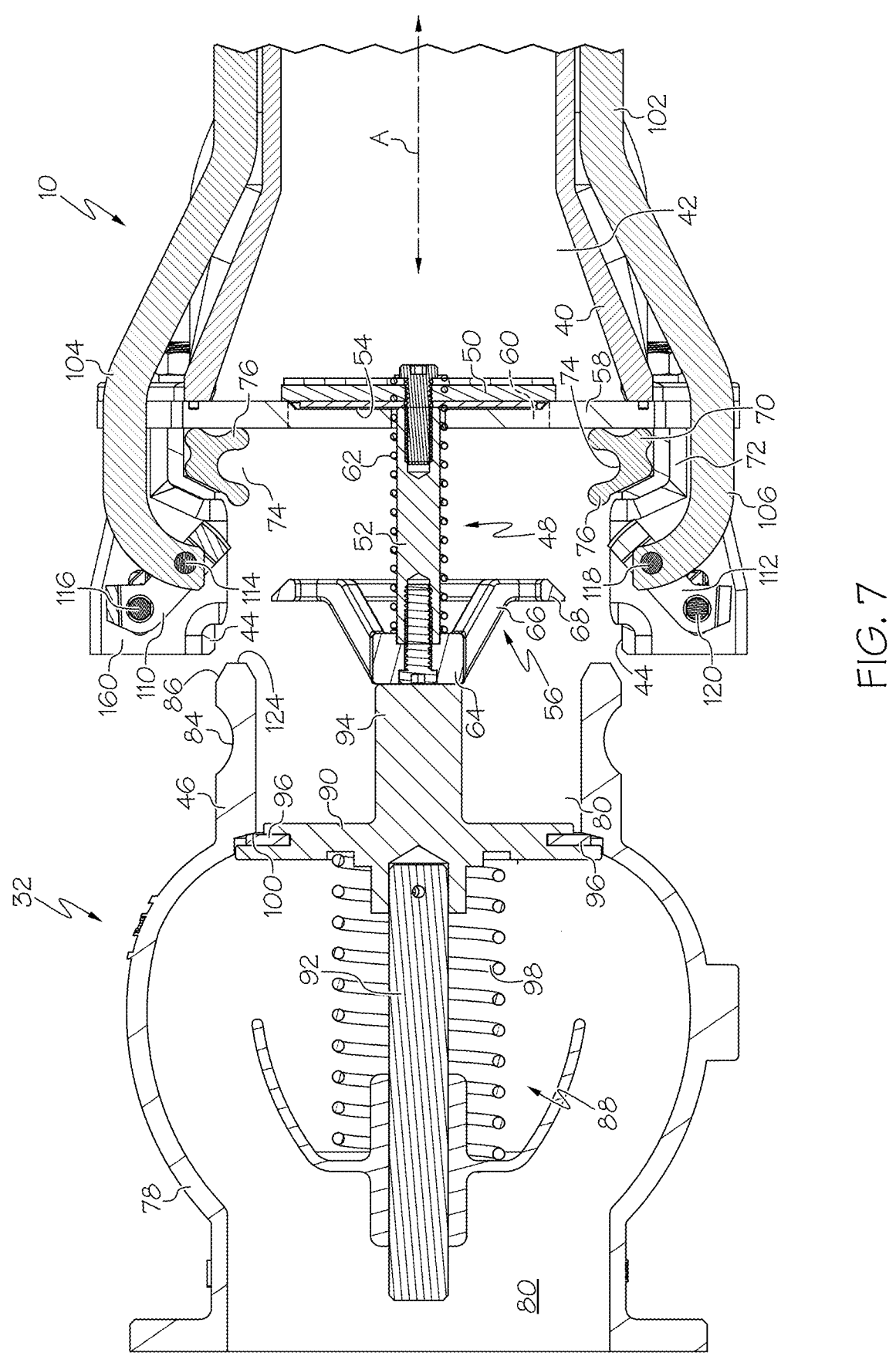
FIG. 7 shows the coupler and adapter of FIG. 6 in an initial step of being coupled together.
Figure 8:
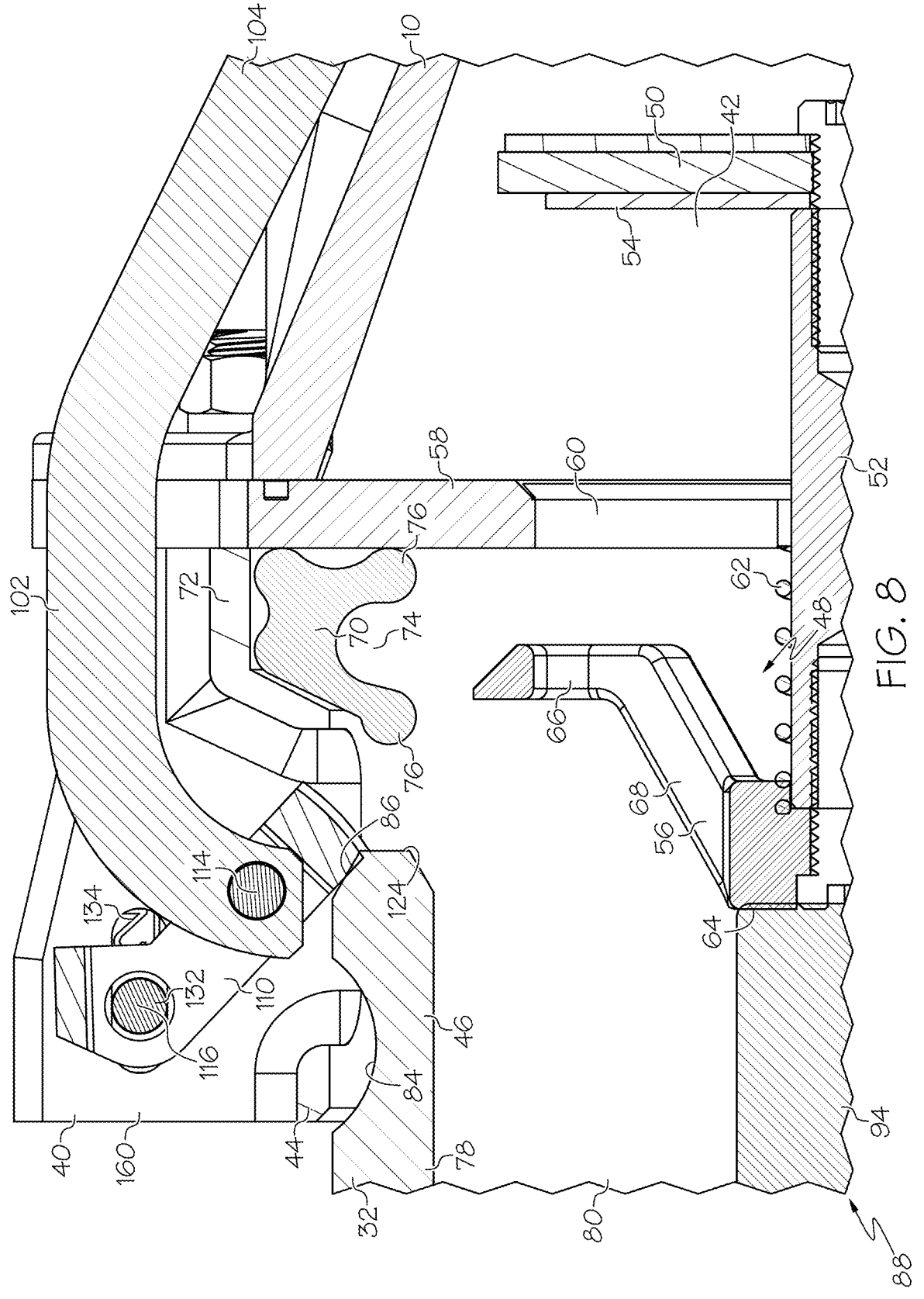
FIG. 8 is a detail view of the coupler and adapter of FIG. 7, with the coupler and adapter further coupled together.

In order to couple the coupler 10 and the adapter 32, the coupler 10 and adapter 32 are positioned to be facing each and be axially aligned, as shown in FIG. 6. At this stage, the extension portion 94 of the poppet valve 88 is spaced away from the head 64 of the actuator 56 of the poppet valve 48. The coupler 10 and/or adapter 32 are then moved axially toward each other such that the connection portion 46 of the adapter 32 is aligned with the connection portion 44 of the coupler 10, as shown in FIG. 7. At this stage, the extension portion 94 of the poppet valve 88 contacts the head 64 of the actuator 56 of the poppet valve 48. The adapter 32 and coupler 10 are then urged axially together as shown in FIG. 8. The spring 62 of the coupler 10 may be stiffer/stronger than the spring 98 of the adapter 32, such that the spring 98 is compressed, thereby opening the poppet valve 88 of the adapter 32.

Once the poppet valve 88 is open (or alternatively, if the spring 98 of the adapter 32 is stiffer/stronger than the spring 62 of the coupler 10), further relative axial movement between the adapter 32 and the coupler 10 causes the engagement surface 86 of the adapter 32 to engage the radially inner ends of the cams 110, 112, and the angled nature of the engagement surface 86 moves the cams 110, 112 and/or arm portions 104, 106 radially outwardly, moving the arm 102 from the energized position 102' to a greater, second or supplemental energized position. In this case, the arm 102 may be energized or sprung to a position between the arm position 102' and the arm position 102" shown in FIG. 4.

Figure 9:
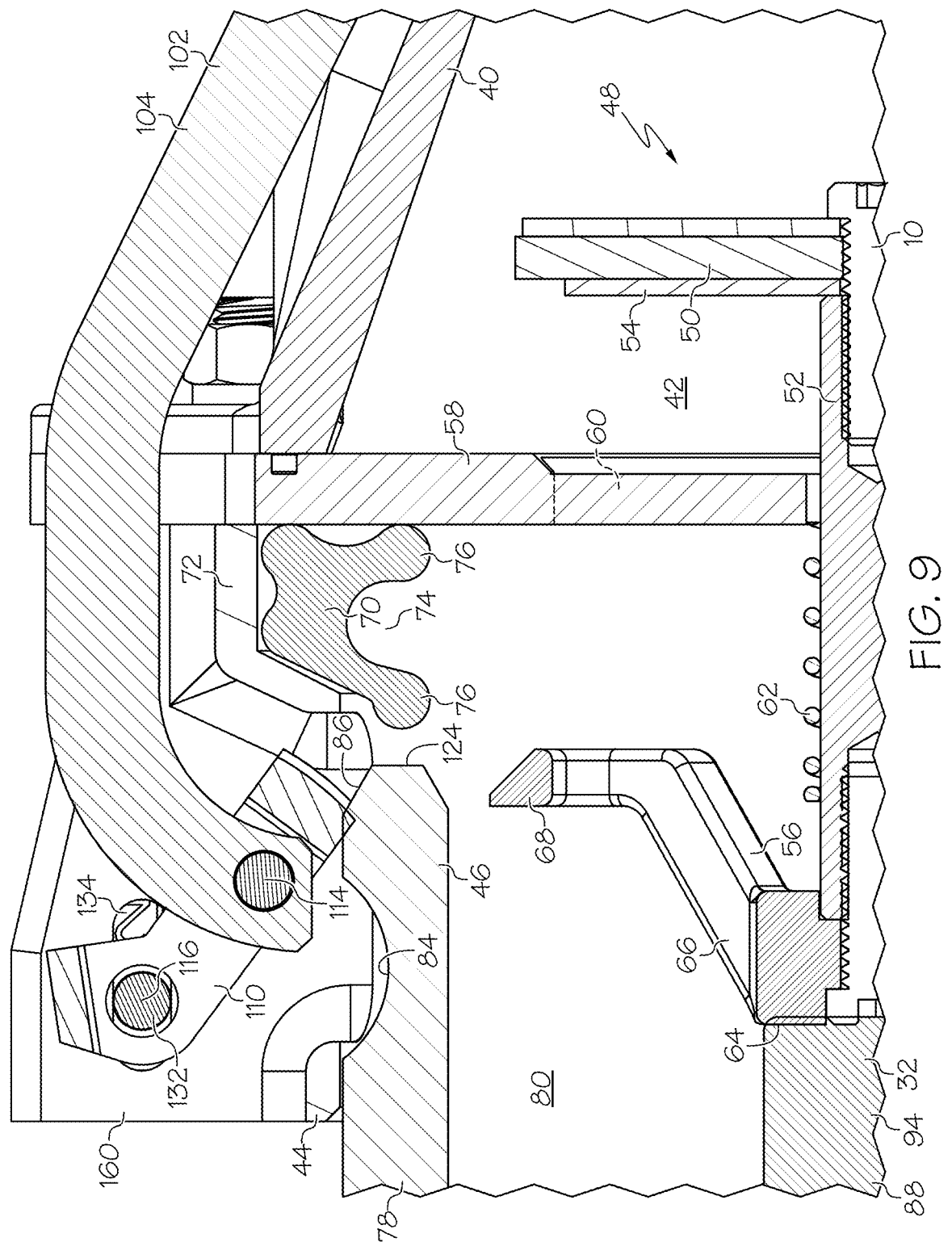
FIG. 9 shows the coupler and adapter of FIG. 8, with the coupler and adapter further coupled together.

In addition, the scaling plate 50 and/or sealing plate 90 are moved axially rearwardly, opening the associated poppet valves 48, 88 as shown in FIG. 8. Further axial movement causes the adapter 32/engagement surface 86 to move the cams 110, 112 and/or first 104 and second 106 arm portions radially outwardly, as shown in FIG. 9, thereby providing or increasing the inward biasing force acting on the first 104 and second 106 arm portions. At this stage the arms 102 may be in the arm position 102" shown in FIG. 4.

Figure 10:
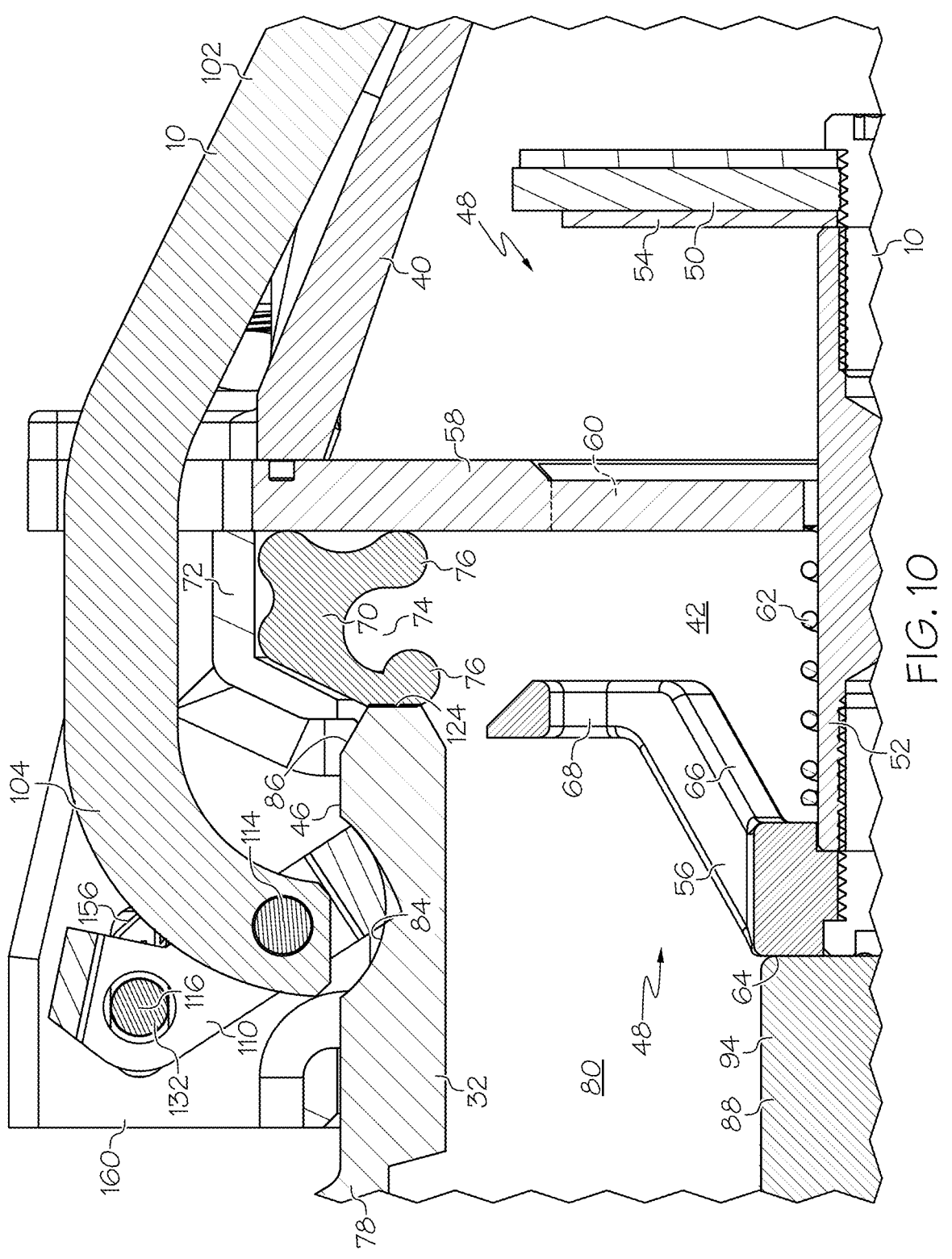
FIG. 10 shows the coupler and adapter of FIG. 9, fully coupled together.
Figure 11:
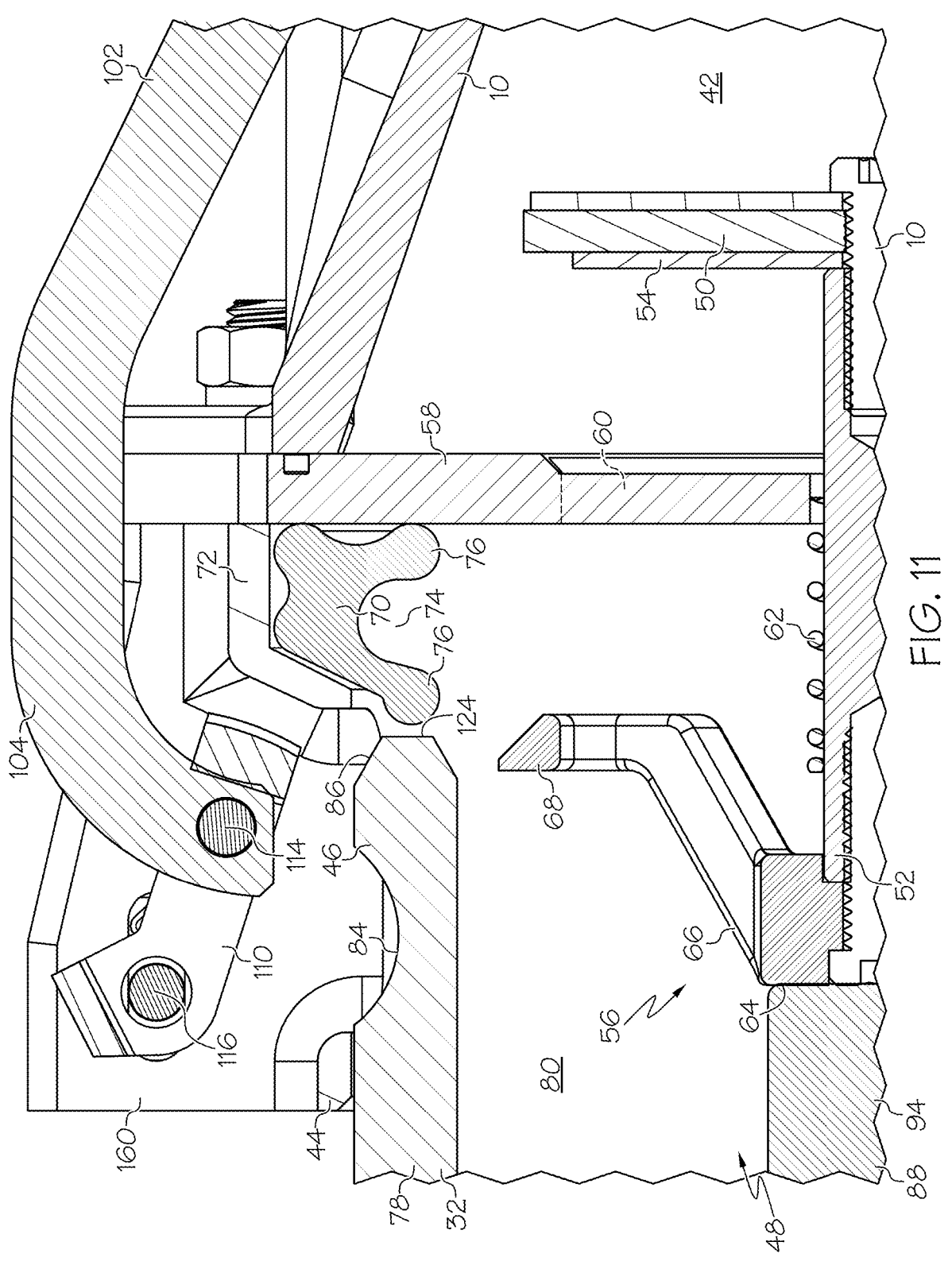
FIG. 11 shows the coupler and adapter of FIG. 10, with the handle retracted to enable separation of the coupler and adapter.
Figure 12:
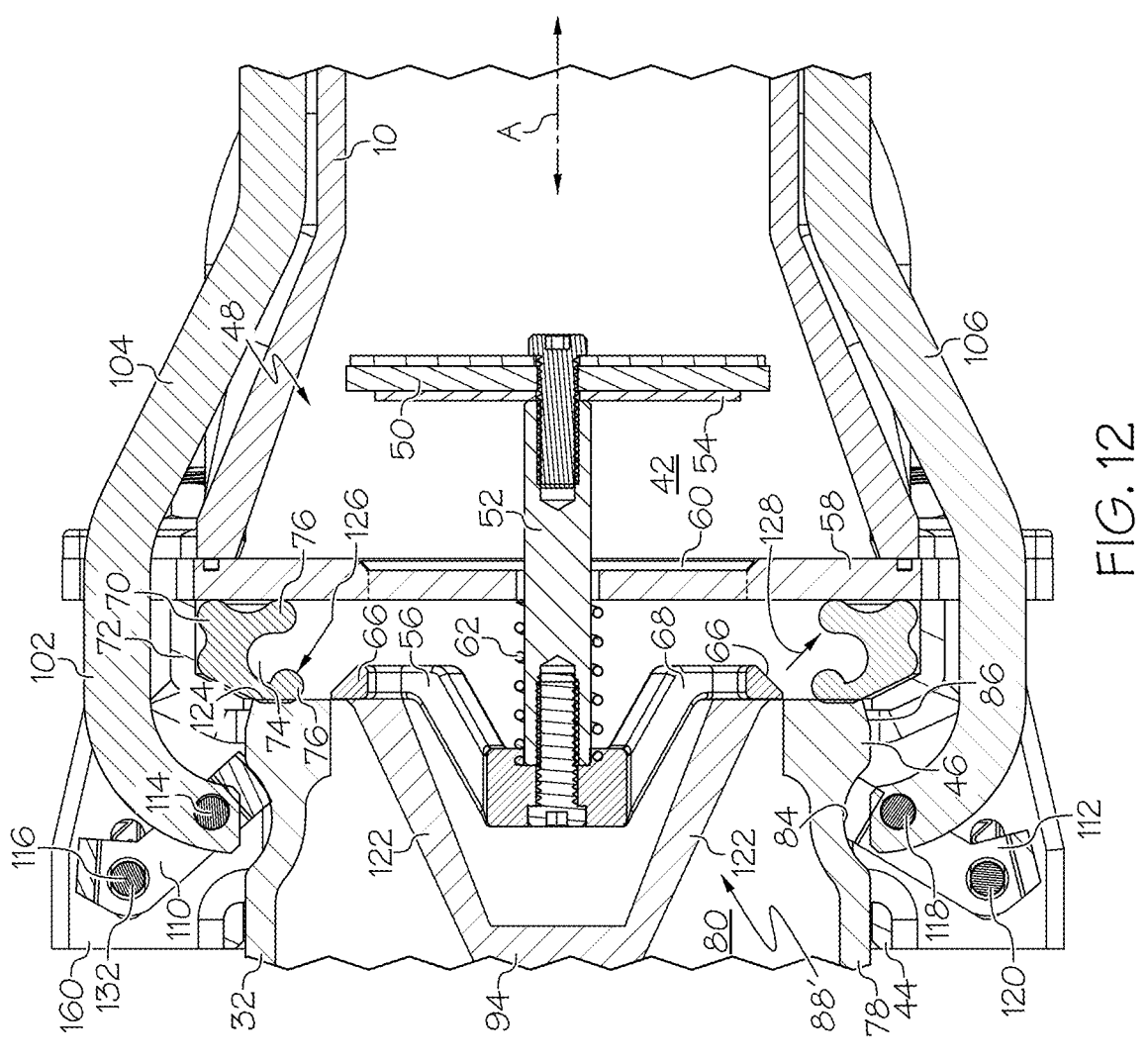
FIG. 12 shows the coupler and adapter of FIG. 10, where the adapter includes an alternate poppet valve.

Once the adapter 32 is advanced axially inside the coupler 10 a sufficient depth, the arm portions 104, 106, and in particular the cams 110, 112, are aligned with and received in the groove 84 of the adapter 32, springing radially inwardly, as shown in FIG. 10. The spring force of the arm portions 104, 106 also retain the cams 110, 112 in the groove 84. The cams 110, 112 and/or arm portions 104, 106 thereby interlock with the groove 84 to securely couple the coupler 10 and the adapter 32 together. In particular, as can be seen in FIG. 10, each cam 110, 112 (with only cam 110 being shown in FIG. 10) is received in the groove 84 and is oriented at an angle at that is at least partially parallel to, and/or not perpendicular to and/or not parallel with in one case, the central axis A, and each cam 110, 112 can be angled axially rearwardly, moving from the radially outer to the radially inner direction. In this manner, any attempted separation of the adapter 32 from the coupler 10 in the axial direction transmits such force to the cams 110, 112, which in turn transmit the force to the arm portions 104, 106 which resist the axial separation forces. In particular, since the arm portions 104, 106 are already sprung radially outwardly, the arm portions 104, 106 resist being sprung further radially outwardly as determined by Hooke's law. In this manner the cams 110, 112 operate a similar manner to how a cam/pawl arrangement works in a gear ratchet mechanism, where the cams 110, 112 lock into the groove 84 preventing axial separation, and the arm 102 acts as a spring holding the cams 110, 112 in place.

The coupler 10 and the adapter 32 can thereby be easily and repeatably coupled together, simply by, in one case, pressing the coupler 10 over the adapter 32 and inserting the adapter 32 to a sufficient axial depth. No further actuation or manual operation is required by a user/operator to secure the coupler 10, and in particular the coupler 10 is configured such that when the coupler 10 receives the adapter 32 therein at the sufficient depth the arm portions 104, 106 each automatically move radially inwardly into the groove 84 to thereby couple the coupler 10 and the adapter 32 without any manual manipulation of the arm 102 by the operator.

When the coupler 10 and the adapter 32 are in the coupled position, as shown in FIG. 10, the extension portion 94 of the poppet valve 88 of the adapter 32 engages the head 64 of the actuator 56 of the poppet valve 48 of the coupler 10. The spring 62 of the poppet valve 48 of the coupler 10 and the spring 98 of the poppet valve 88 of the adapter 32 are compressed, and the poppet valves 48, 88 are thereby opened (only poppet valve 48 is visible in FIG. 10) to allow fluid (vapor) to flow therethrough, and the transfer of fluid through the associated vapor line 30 can be initiated.

The radially outwardly-positioned actuating flange 66 of the actuator 56/poppet valve 48 of the coupler 10 provides a universal poppet valve 48 that can be used with a variety of poppet valves of the adapter 32. In particular while FIGS. 6-11 show the poppet valve 88 of the adapter 32 as including a radially centered extension portion 94, differing adapters 32 can have differing poppet valves, and not all poppet valves may include the radially-centered extension portion 94. In particular, some adapters can include poppet valves with actuating components that are not radially centered and/or are located axially forwardly of the extension portion 94 of the adapter 32. For example, in the embodiment of FIG. 12, the poppet valve 88' of the adapter 32 has a shorter an extension portion 94, and has a forwardly extending engagement surface 122 which receives the actuator 56 therein. In this embodiment the actuating flange 66 of the poppet valve 48 can be engaged by the engagement surface 122 of the poppet valve 88' to open the poppet valve 48, 88'. In this manner the actuator 56 of the poppet valve 48 of the coupler 10 can be used with any of a wide variety of adapter poppet valves 88, and be opened in the desired manner upon coupling of the coupler 10 and the adapter 32.

When the adapter 32 is coupled to the coupler 10, a forward end 124 of the body 78 of the adapter 32, and in particular a forward end 124 of the connection portion 46, is configured to sealingly engage the seal 70. More specifically the forward end 124 of the connection portion 46 is configured to sealingly engage an axially forward one of the lips 76. Since the lip 76 is positioned immediately adjacent to the groove 74, the lip 76 can be deformed axially rearwardly into the groove 74 and thereby form a good seal with the adapter 32 when the adapter 32 is coupled to the coupler 10. In addition, when vapor is flowing through the coupler 10, the pressure of the fluid in the coupler 10 urges the forward lip 76 axially forwardly and radially outwardly in the direction of arrow 126 of FIG. 12, thereby pressing the forward lip 76 into sealing engagement with the adapter 32. Similarly, the pressure of the fluid in the coupler 10 urges the rearward lip 76 axially rearwardly and radially outwardly in the direction of arrow 128, thereby pressing the rearward lip 76 into sealing engagement with the coupler 10.

In contrast, the use of flat gaskets, that lack the groove 74/lip(s) 76, can require the gasket to be pressed evenly on all sides to form an good seal. In addition, flat gaskets can be prone to compression set and damage when excessive forces are applied, which effects can be reduced by use of the seal 70 shown herein. It is noted that the force provided by the arm 102 during coupling, which pulls the adapter 32 into contact with the seal 70, is ultimately provided manually by the user by pressing the coupler 10 axially over the adapter 32, which manual force is in turn at least partially converted to spring energy stored in the arm 102. The deformable/deflectable nature of the seal 70 ensures that the adapter 32 can thereby form a good seal with the seal 70 due solely to the application (and storage, due to the spring force of the arm 102) of manual forces.

The arm 102 is configured to be axially moved between a forward/engaged/deenergized position, as shown in FIGS. 2, 3, 6 and 7 (and FIG. 4, in solid lines), and a rearward/disengaged/energized position as shown in FIG. 9 (and FIG. 4, in hidden lines). In one case, the body 40 of the coupler 10 includes a pair of axially extending grooves/recesses 130 formed therein (see FIGS. 2, 3 and 5), wherein each recess 130 is shaped and configured to closely receive at least part of an arm portion 104, 106 therein to guide movement of the arm 102 between the forward and rearward positions. When the arm 102 is moved to the axially rearward position, the arm 102 and arm portions 104, 106 slide axially rearwardly in the recesses 130 and the arm 102 and arm portions 104, 106 are moved axially away from the adapter 32.

The body 40/recesses 130 can have an area of increased thickness (in the radial direction) in the area of portion 131 (or a tapered area at which the recesses 130 terminate) of FIG. 2, such that when the arm 102 is retracted, the arm portions 104, 106 are sprung radially outwardly. When the assembly is in the coupled configuration shown in FIG. 10, such movement pulls the arm portions 104, 106 (and in particular the cams 110, 112) radially outwardly and out of the groove 184, thereby uncoupling the adapter 32 and coupler 10. The adapter 32 can then be retracted axially out of the coupler 10. The user can then release the arm 102, and the arm 102/arm portions 104, 106 return to the rest/unbiased/deenergized position. In this manner the arm 102 is retractable in an axial direction which causes the first 104 and second 106 arm portions to move radially outwardly to thereby decouple the adapter 32 and the coupler 10.

Figure 13:
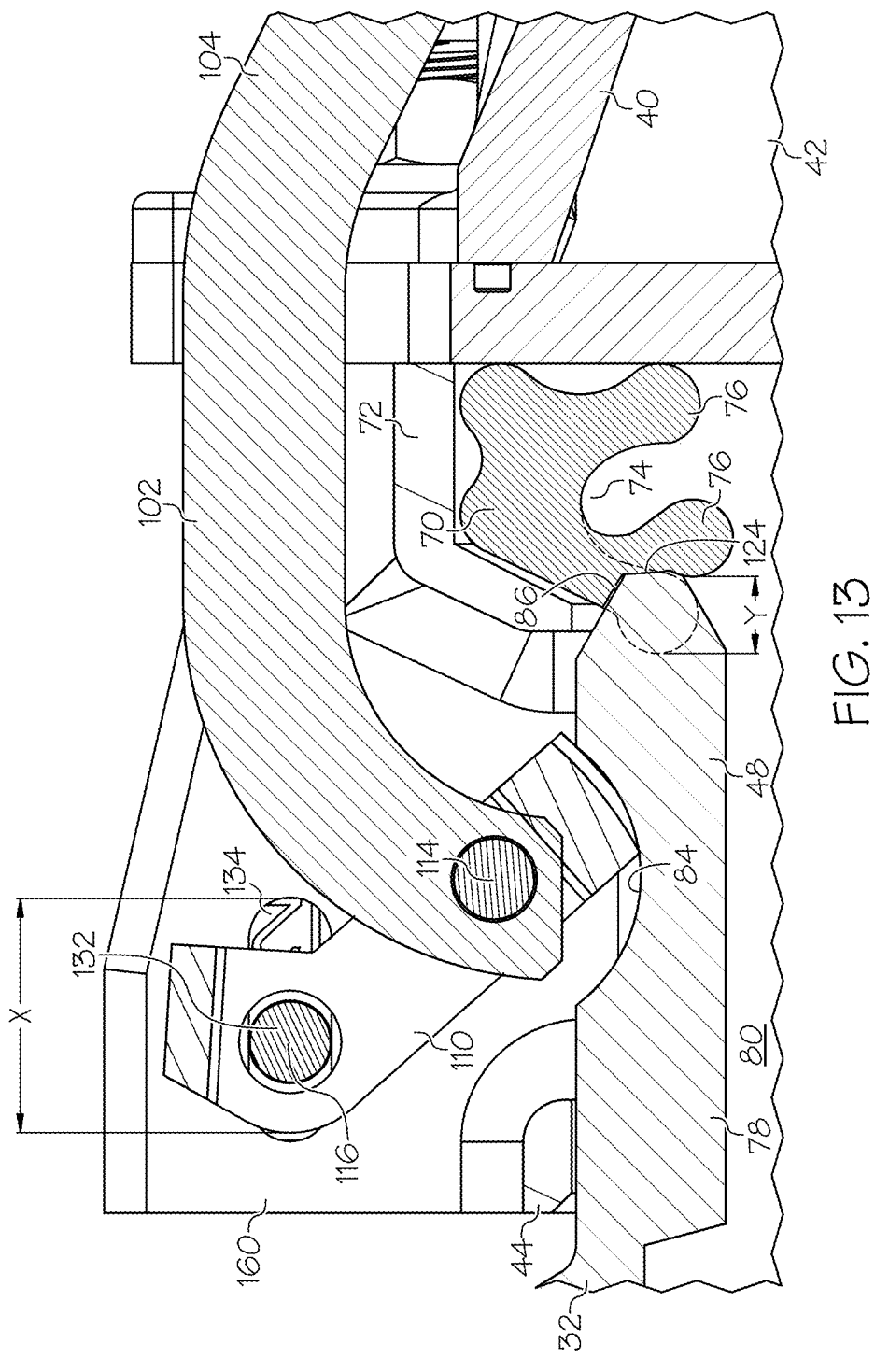
FIG. 13 shows the coupler and adapter of FIG. 10, where the adapter includes an adjustable handle.

With reference to FIG. 13, in one case each cam 110, 112 can be movably/adjustable coupled to the body 40 of the coupler 10. In particular, the pivot axis 116 of each cam 110, 112, where the cam 110, 112 is pivotally coupled to the body 40, can be adjusted in the axial direction to thereby adjust the depth in which the adapter 32 is received in the coupler 10, and thereby adjust the force that the adapter 32 applies to the seal 70 to the desired amount. In one case each cam 110, 112 includes a pair of oppositely-extending cam pins 132 (FIGS. 13 and 15) extending in a tangential direction and defining the pivot axis 116. Each cam pin 132 is received in a pivot pin slot 134 formed in the body 40. If it is desired to adjust the axial positioning of the pivot pin 132/cam 110, 112, the pivot pin 132 can be moved to the desired position in the pivot pin slot 134. Thus the pivot pin 132 can in one case be movable across a range X shown in FIG. 13, which correspondingly adjust the amount of engagement/compression of the seal 70 across range Y. The manner of release/ attachment of the cam pivot pins 132 can vary, but in one case a threaded set pin is used to lock the cam pivot pins in place, or a worm drive or the like is attached to the cam pivot pins 132 that can be rotated to adjust the position of the cam pivot pins 132.

Figure 14:
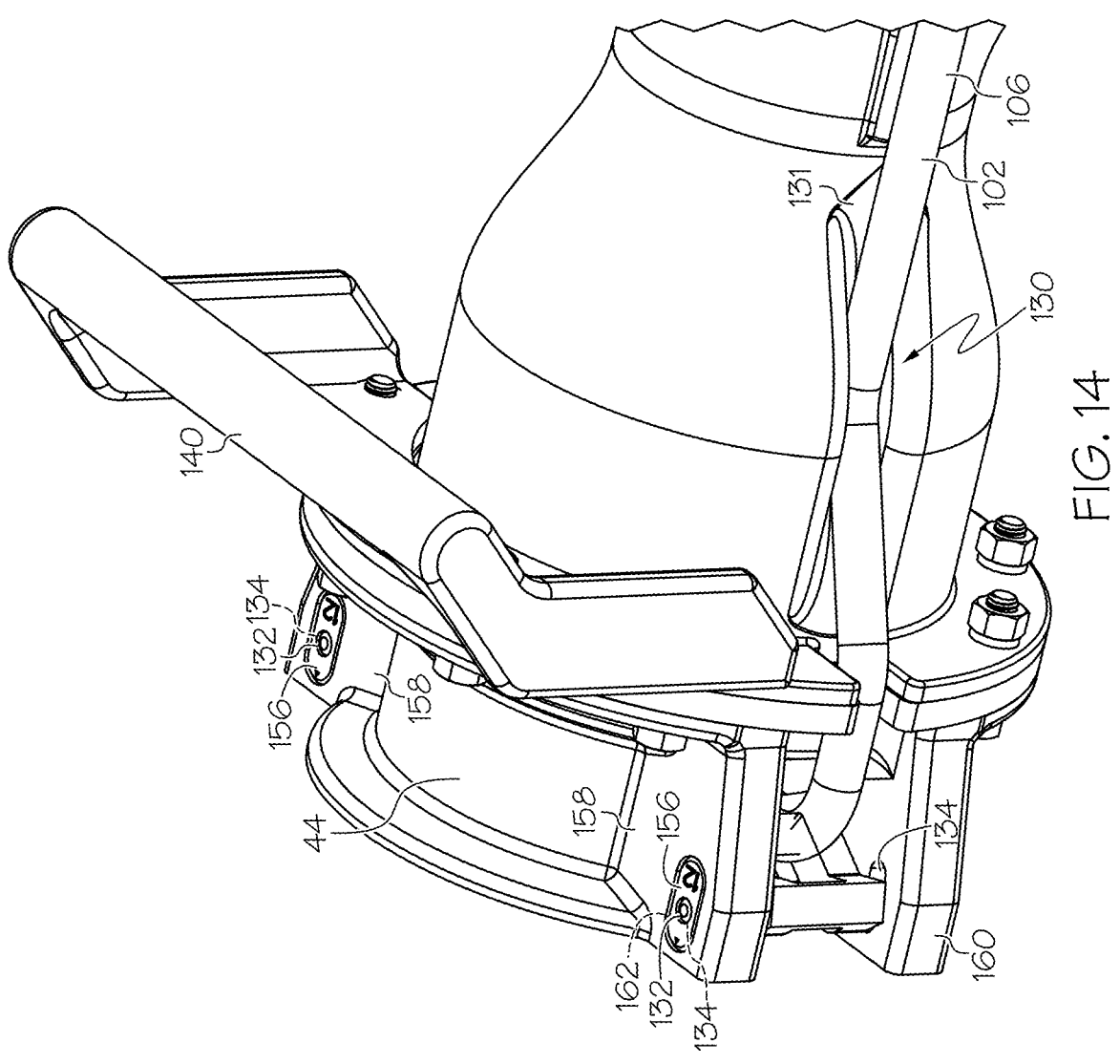
FIG. 14 is an rear perspective view of the coupler of FIG. 13.

With reference to FIG. 14, the body 40 of the coupler 10 can include a pair of radially-outwardly extending upper 158 and lower 160 flanges on either side thereof. Each flange 158, 160 can include a pivot pin slot 134 therein, and each pivot pin slot 134 can be configured to receive a pivot pin retainer or cam coupler 156 therein. In the illustrated embodiment, each pivot pin slot 134 is generally oval having a length extending in the axial direction, and each pivot pin retainer 156 is sized and configured to closely fit in an associated pivot pin slot 134. Each pivot pin retainer 156 has an opening or recess 162 formed therein or extending therethrough, and each opening 162 is sized and positioned to receive a cam pin 132 therein.

Figure 15:
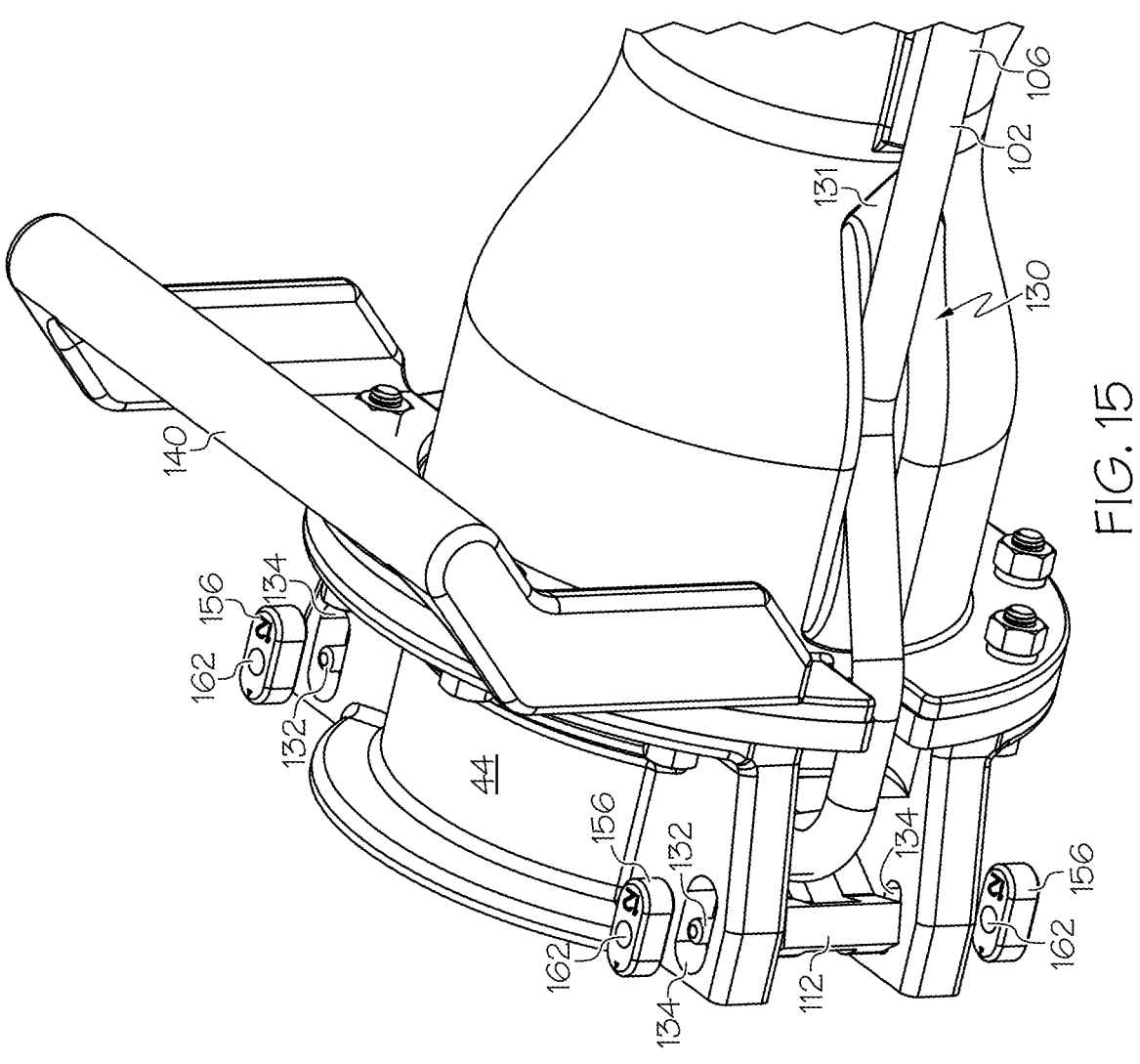
FIG. 15 shows the coupler of FIG. 14, with the cam retainers exploded away.

In order to adjust the axial positioning of the cams 110, 112, the pivot pin retainers 156 can be removed from the associated pivot pin slot 134, as shown in FIG. 15. The cams 110, 112 can be adjust axially such that their cam pins 132 slide axially in the associated pivot pin slot 134. A different pivot pin retainer 156 can then be positioned in the pivot pin slot 134, where the replacement pivot pin retainer 156 has a hole 162 with an axial location that corresponds to the axial location of the cam pins 132.

Figure 16:
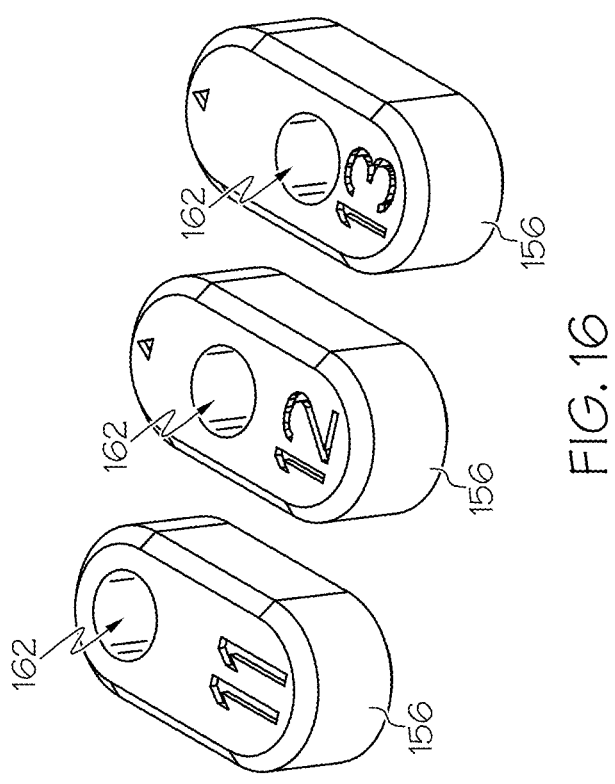
FIG. 16 is a perspective view of a set of cam retainers.
Figure 17:
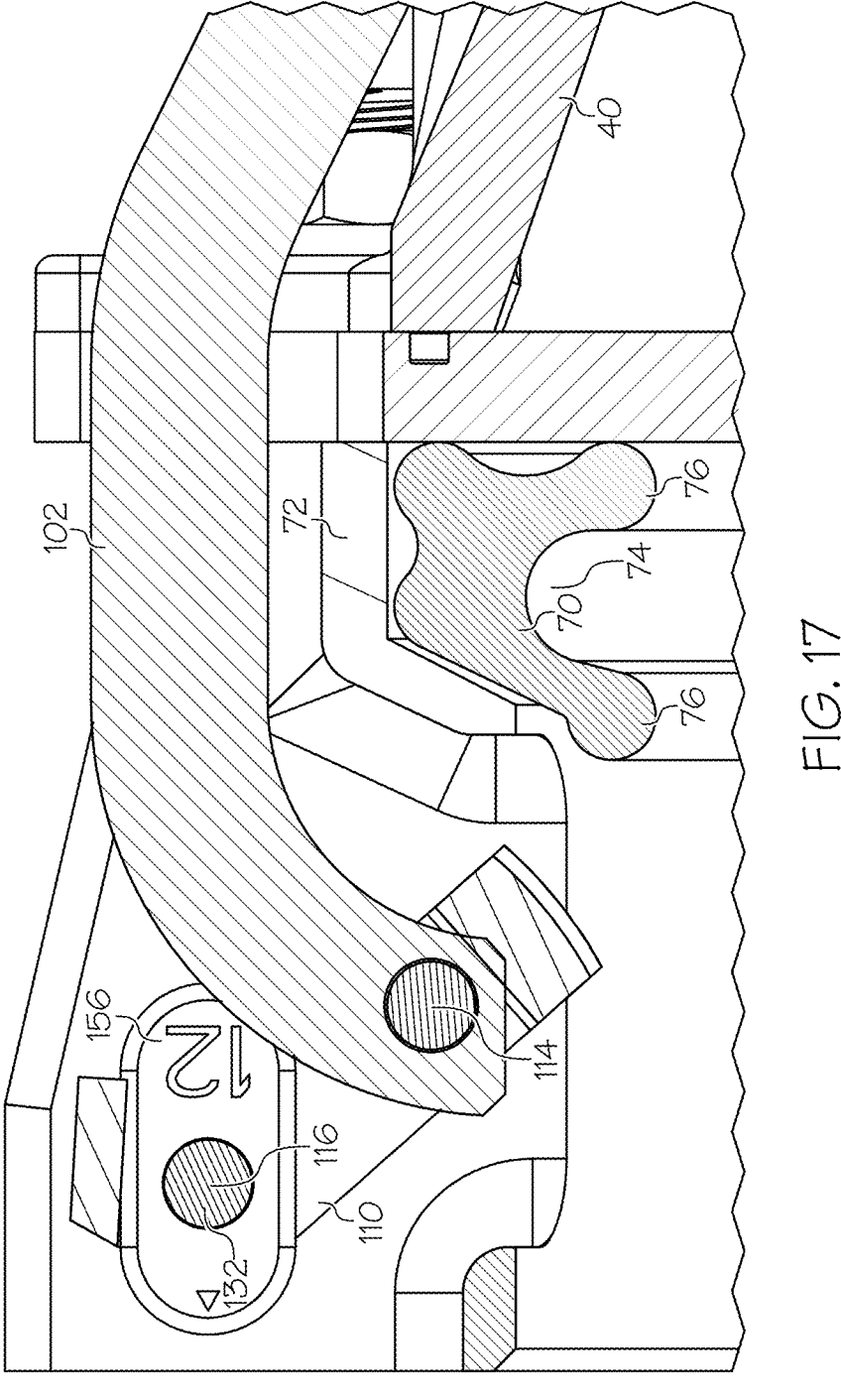
FIG. 17 is a cross section of the coupler of FIG. 13.

As shown in FIG. 16, the different pivot pin retainers 156 can have differing locations of the holes 162 in the axial direction. In this manner, the differing location of the holes 162 enables movement of cam pins 132, and secures the cam pins 132 in place which in turn enables the pivot axes 116 of the cams 110, 112 to be adjusted. This movement adjusts the amount of engagement/compression of the seal 70 as noted above.

The coupler 10 can thereby include or be used with a set of pivot pin retainers/cam couplers 156 that are removably couplable to the body 40. The pivot pin retainers/cam couplers 156 are configured to be coupled to an associated cam 110, 112 when the pivot pin retainers 156 are coupled to the body 40 to fix the pivot location of each cam 110, 112 at a first axial location. The pivot pin retainers 156 are replaceable with another set of pivot pin retainers 156 that, when coupled to the body 40, fix the pivot location of each cam 110, 112 at a second axial location.

The pivot pin retainers 156 can be marked with different indicia to distinguish the different pivot pin retainers 156 and also provide information regarding the effect of the use of the pivot pin retainers 156. In the embodiment of FIG. 16 the pivot pin retainers 156 are marked with different numbers, where the pivot pin retainers 156 with lower numbers position the cams 110, 112 relatively axially forwardly, away from the seal 70, the creating less compression of the seal 70 during engagement and requiring less force to complete the connection. Conversely the pivot pin retainers 156 with relatively higher numbers in FIG. 16 fix the cams 110, 112 at positions relatively axially rearwardly, toward the seal 70, the creating greater compression with the seal 70 during engagement and requiring greater force to make the connection.

While FIGS. 14-17 show an embodiment wherein the cams 110, 112/cam pins 132/pivot axes 116 can be axially moved by the use of differing pivot pin retainers 156, it should be understood that such axial movement can be achieved by various other means and mechanisms, such as by the use of worm drives, by the use of components that are axially slidable/lockable in the pivot pin slots 134 such as by tightening/loosening a fastener, by the use of ratchet/type movement/release mechanisms, or the like. In addition, in the embodiment of FIGS. 14-17, the position of the cam pins 132/holes 162 can be reversed such that the cam pins 132 are positioned on the pivot pin retainers 156, and the holes 162 are positioned on the cams 110, 112.

As shown in FIGS. 2, 3 and 5, the coupler 10 can include a fixed forward handle 140 coupled to an outer surface of the body 40 and a fixed rearward handle 142 coupled to the body 40 and positioned adjacent, and rearward of, the arm 102. The rearward handle 142 can include a first handle portion 144, a second handle portion 146 and a gripping portion 148 oriented parallel to the gripping portion 108 of the arm 102. The handle 142 can also be positioned relatively close to the arm 102, in one case such that the gripping portions 108, 148 are separated by less than about six inches, and in another case less than about four inches, in the axial direction when the arm 102 is in the engaged and/or disengaged positions. The gripping portion 148 of the fixed handle 142 can be positioned axially rearwardly of the gripping portion 108 of the arm 102 when the arm 102 is in the engaged and/or disengaged position.

This positioning and/or spacing enables the handle 142 to be positioned such that a user can place the user's palm on the fixed handle 142 and simultaneously reach, pull and manipulate the arm 102 with the user's fingers (or vice versa), to pull the arm 102 to the engaged position using the handle 142 as an fixed anchor or leverage point. The handle 142 can be fixedly coupled in place, but may removably coupled via threaded fasteners or the like, and thus be able to be removed and replaced if damaged.

As shown in FIG. 5, the fluid path 42 of the coupler 10 can include an entrance portion 150 with a relatively large cross sectional area, and a distal portion 152 with a relatively small cross sectional area compared to the entrance portion 150. The fluid path 42 also includes a throat portion 154 positioned between the entrance portion 150 and the distal portion 152. Both the entrance portion 150 and the distal portion 152 can have generally constant cross sectional area (cylindrical in one case) fluid paths. The throat portion 154/fluid path 42 in the throat portion 154 can have an internal shape generally corresponding to a Gaussian distribution curve (e.g. a "bell-curve" shape), which provide a smooth transition of fluid from the entrance portion 150 to the distal portion 152 (and vice versa). The fluid path 42 in the throat portion may differ from Gaussian curve, in one case, at each point therealong and/or at any segment extending at least 25% of the length thereof in one case, or at least 50% of the length thereof, by no more than about 5% in one case, or no more than about 10% in another case.

In particular the throat portion 154 at both the forward and rearward ends (both the upstream 154a and distal end 154b)

has a shape along its inner walls that is parallel or close to parallel (within about 5 degrees or in one case) to the central axis A, and thus parallel to flow through the entrance portion 150 and the throat portion 154. The maximum curvature/ maximum angle/maximum slope (e.g. tangent of the curve) of the internal shape of the throat portion 154, relative to the central axis A, and/or the maximum range of change of the cross sectional area of the throat portion 154, can be located at or adjacent to the center of the throat portion 154 in the axial direction (e.g. within +/−20% of the midpoint of the throat portion 154).

As shown in FIG. 5, the distal portion 152 of the coupler 10 can include a transition portion 152a that provide a change in angle of the central axis of fluid flowing there-through. In particular, the downstream portion of the distal portion 152 can have a central axis B that is oriented at an angle C relative to a central axis A of the entrance portion 150 and/or at an angle relative to the adapter 32. This angle C ensures that the vapor line 30, which can be coupled to the distal portion 152, can be coupled to the coupler 10 in a straight/linear orientation and angle toward, and rest on, the ground surface. In certain other designs, rather than provid-ing the angle/curvature in the distal portion 152, the vapor line 30 can be attached such that the vapor line 30 is parallel to/aligned with the central axis A of the entrance portion 150 and/or the adapter 32.

In that case however, the weight of the vapor line 30, particularly when the vapor line 30 is a pliable hose, can cause the hose to sag as the hose is pulled downwardly toward the ground due to gravitational forces. Such sagging of the hose/vapor line 30, especially for extended times and repeated cycles, can cause stress concentration and weak-ening of the hose/vapor line 30 in the area of the sag/bend of the hose, and ultimately lead to compromising and/or failure of the hose/vapor line 30. Thus, by instead providing the angle C in the coupler 10, such sagging of the hose/vapor line 30 is avoided, which in turn reduces or eliminates stress concentrations, resulting in increased life of the vapor line 30.

The angle C can vary as desired, but in one case is about 135 degrees or in another case between about 115 degrees and about 155 degrees. In addition, it should be understood that the adapter 32, and in particular in this context the entrance portion 150 and the distal portion 152, can be made of metals, fiberglass, polymers or other of relatively rigid materials such that the entrance portion 150 and the distal portion 152 retain their shape, and in particular, the angular orientation as outlined above, in the absence of any outside forces. This ensures that the coupler 10, and in particular, the distal portion 152 does not sag or bend when the vapor line 30 is coupled thereto. The rearward end of the coupler 10/distal portion 152 can be relatively smooth and cylindri-cal on both its inner and/or outer surfaces so that the coupler 10 can be coupled to any of a wide variety of vapor lines having various types of coupling arrangements.

Thus it can be seen that the coupler 10 disclosed herein is simple and intuitive to use, and provides a strong and reliable connection.

Although the invention is shown and described with respect to certain embodiments, it should be clear that modifications will occur to those skilled in the art upon reading and understanding the specification, and the present invention includes all such modifications.

What is claimed is:

1. A system including a coupler configured to be coupled to an adapter, the coupler comprising:

a body defining a fluid path through which vapor is configured to flow;

a valve positioned in the fluid path, wherein the valve is biased to a closed position and configured to be moved to an open position when the coupler is coupled to an adapter; and an arm coupled to the body, wherein the arm includes a first arm portion located on a first side of the body and a second arm portion located on a second, opposite side of the body, wherein the arm is configured to be moved to an energized position wherein the first and second arm portions are both biased radially inwardly and thereby configured such that when the coupler receives the adapter, having a groove, in the coupler at a sufficient depth the first and second arm portions each move radially inwardly into the groove to thereby couple the coupler and the adapter.

2. The system of claim 1 wherein the arm is configured such that when the arm is in the energized position the first and second arm portions are deformed in a radially outward direction from their undeformed positions, to thereby cause the first and second arm portions to be biased radially inwardly.

3. The system of claim 2 wherein the arm is configured such that the first and second arm portions are each deform-able in the radially outward direction by engagement of the arm with an outer surface of the body when the arm is moved in an axially rearward direction.

4. The system of claim 1 wherein the arm is positioned externally of the fluid path, wherein both arm portions are oriented generally parallel to the fluid path, and wherein the body includes a pair of axially extending recesses formed therein, each recess receiving at least part of an arm portion therein.

5. The system of claim 1 wherein the arm includes a gripping portion coupled to the first arm portion at one end thereon and to the second arm portion at the other end thereof, wherein the gripping portion is oriented generally transverse to the fluid path, and wherein the gripping por-tion, the first arm portion and the second arm portion are a single continuous component that is generally "U" shaped in top view.

6. The system of claim 1 wherein the coupler is configured such that when the coupler receives the adapter therein at the sufficient depth the first and second arm portions each automatically move radially inwardly into the groove, with-out any manual manipulation of the arm portions by an operator, to thereby couple the coupler and the adapter.

7. The system of claim 1 wherein the system is configured such that when the coupler is coupled to the adapter, the arm is retractable in an axial direction to cause the first and second arm portions to move radially outwardly to thereby decouple the adapter and the coupler.

8. The system of claim 1 wherein the first arm portion includes a first cam coupled to a distal end of a main body the first arm portion, and wherein the second arm portion includes a second cam coupled to a distal end of a main body the second arm portion, and wherein the first and second cams are each configured move radially inwardly into the groove to thereby couple the coupler and the adapter.

9. The system of claim 8 wherein the first cam is pivotally coupled to the distal end of the main body of the first arm portion, and is also pivotally coupled to the body, and wherein second cam is pivotally coupled to the distal end of the main body of the second arm portion, and is also pivotally coupled to the body.

10. The system of claim 9 wherein a position at which each cam is coupled to the body is adjustable in an axial direction.

11. The system of claim 9 wherein the first cam is coupled to the body at a pivot location, and wherein the second cam is coupled to the body at a pivot location, and wherein each pivot location is adjustable in an axial direction.

12. The system of claim 11 further comprising a pair of cam couplers that are removably couplable to the body and configured to be coupled to an associated cam when the cam couplers are coupled to the body to fix the pivot location of each cam at a first axial location, and wherein the pair of cam couplers are replaceable with another set of cam couplers that, when coupled to the body, fix the pivot location of each cam at a second axial location.

13. The system of claim 12 wherein each cam includes at least one of a pin or a recess, and wherein each cam coupler has at least one of the other one of a pin or recess that is configured to be removable coupled to the at least one of a pin or recess of the associated cam to thereby axially couple each cam to an associated cam coupler.

14. The system of claim 12 wherein the body includes a pair of slots and wherein each cam coupler is configured to be closely and removably received in the slot.

15. The system of claim 1 wherein the arm is positioned on the body such that the arm is in the energized position due to engagement between the arm and the body, and wherein the arm is axially movable to a supplemental energized position wherein the first and second arm portions are both biased radially inwardly with a greater force compared to when the arm is in the energized position.

16. The system of claim 1 wherein the arm is configured to be automatically moved to the energized position when the coupler receives the adapter therein due to engagement between the arm and the adapter.

17. The system of claim 1 wherein the coupler includes a seal positioned in the fluid path, the seal having a circumferentially extending groove defining a pair of circumferentially extending lips on opposite axial sides of there groove, wherein one of the lips is configured to sealingly engage the adapter when the adapter is coupled to the coupler.

18. The system of claim 1 wherein the fluid path includes an entrance portion with a relatively large cross sectional area, a distal portion with a relatively small cross sectional area compared to the entrance portion, and a throat portion positioned between the entrance portion and the distal portion, wherein the throat portion has an internal shape generally corresponding to a Gaussian distribution curve.

19. The system of claim 18 wherein a forward end and a rearward end of the internal shape of the throat portion is parallel or generally parallel with the inner walls of the entrance portion and the distal portion, and wherein a maximum slope of the internal shape of throat portion is located at or adjacent to a center of the throat portion in an axial direction.

20. The system of claim 1 wherein the fluid path includes an entrance portion with a central axis and a distal portion with central axis at an angle of between about 115 degrees and about 155 degrees relative to the central axis of the entrance portion, wherein the entrance portion and the distal portion are made of relatively rigid materials such that the entrance portion and the distal portion retain their relative angular orientation in the absence of any outside forces.

21. The system of claim 1 wherein the coupler further includes a fixed handle coupled to an outer surface of the body and positioned adjacent to the arm such that a user can place the user's palm on the fixed handle and simultaneously manipulate the arm with the user's fingers.

22. The system of claim 1 wherein the valve is a poppet valve positioned inside the fluid path, wherein the poppet valve includes a sealing plate configured to sealingly engage a valve seat, wherein the poppet valve includes an actuator coupled to the sealing plate, and wherein the actuator includes a radially-centered head and a radially outwardly-positioned actuating flange that is axially offset from the head.

23. The system of claim 1 wherein the coupler is fixedly coupled to a vapor line that is in turn fluidly coupled to a vapor storage space of a tank, and wherein the coupler is coupled to and in fluid communication with a vapor storage space of a tank carried on at least one of an adjacent tractor or a truck.

24. The system of claim 1 further comprising the adapter, wherein the adapter is received in the coupler at the sufficient depth such that the first and second arm portions are each located at a radially inner position and received in the groove to thereby couple the coupler and the adapter.

25. A coupler comprising:
a body defining a fluid path through which vapor is configured to flow;
a valve positioned in the fluid path, wherein the valve is configured to be biased to a closed position and configured to be moved to an open position when the coupler is coupled to an adapter; and
an arm coupled to the body and positioned externally of the fluid path, wherein the arm includes a first arm portion and a second arm portion, wherein the arm is in, or is configured to be moved to, an energized position wherein the first and second arm portions are both biased radially inwardly to couple to the coupler to the adapter.

26. A method for attaching a coupler comprising:
accessing a storage tank having a vapor space and an adapter in fluid communication with the vapor space, the adapter having a groove;
accessing a coupler including a body defining a fluid path through which vapor is configured to flow, the coupler further including a valve and an arm coupled to the body, wherein the arm includes a first arm portion located on a first side of the body and a second arm portion located on a second, opposite side of the body, wherein the first and second arm portions are both biased radially inwardly; and
moving the coupler in the axial direction toward the adapter such that the coupler receives the adapter therein at a sufficient depth to open the valve and enable the first and second arm portions to each move radially inwardly into the groove to thereby couple the coupler and the adapter.

* * * * *